US012654545B2

(12) United States Patent
Capelle et al.

(10) Patent No.: US 12,654,545 B2
(45) Date of Patent: Jun. 16, 2026

(54) CONTAINER SYSTEM

(71) Applicant: AGCO International GmbH, Neuhausen (CH)

(72) Inventors: Thorsten Capelle, Marktoberdorf (DE); Dominik Schwabbauer, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 448 days.

(21) Appl. No.: 18/255,910

(22) PCT Filed: Oct. 20, 2021

(86) PCT No.: PCT/IB2021/059663
§ 371 (c)(1),
(2) Date: Jun. 5, 2023

(87) PCT Pub. No.: WO2022/136954
PCT Pub. Date: Jun. 30, 2022

(65) Prior Publication Data
US 2024/0042846 A1 Feb. 8, 2024

(30) Foreign Application Priority Data
Dec. 21, 2020 (GB) ..................................... 2020251

(51) Int. Cl.
*B60K 15/067* (2006.01)
*A01B 76/00* (2006.01)

(52) U.S. Cl.
CPC ............ *B60K 15/067* (2013.01); *A01B 76/00* (2013.01)

(58) Field of Classification Search
CPC .................. A01B 76/00; B60K 15/067; B60K 2015/03118; B60K 2015/03151; B60K 2015/03164; B60Y 2200/221
(Continued)

(56) References Cited

U.S. PATENT DOCUMENTS 2,370,190 A 2/1945 Ralston
5,217,507 A 6/1993 Spirig
(Continued)

FOREIGN PATENT DOCUMENTS

CN 106314132 A 1/2017
DE 656650 C 2/1938
(Continued)

OTHER PUBLICATIONS

European Patent Office, International Search Report related to International Patent Application No. PCT/IB2021/059663, mail date Jan. 5, 2022, 12 pages.
(Continued)

*Primary Examiner* — Valentin Neacsu
*Assistant Examiner* — Felicia L. Brittman-Alabi

(57) ABSTRACT

A container system includes first and second separate container bodies and a connector for holding the container bodies together as a container sub-assembly. The container bodies each define an external connector passageway which are aligned co-axially for assembly. The connector is a hollow screw with a threaded shaft which passes through the passageway of a first container body and engages with a thread in the passageway of a second container body. The connector has a head which engages the first container body to clamp the container bodies together as it is tightened. The sub-assembly is affixed to a supporting structure by a fastener having a threaded shaft which passes through the connector to engage a threaded mounting formation on the structure and a head which engages the head on the connector to clamp the connector to the mounting formation.

18 Claims, 4 Drawing Sheets

(58) Field of Classification Search
USPC ........................................................ 280/834
See application file for complete search history.

(56) References Cited

U.S. PATENT DOCUMENTS

| | | | |
|---|---|---|---|
| 6,789,568 | B1 | 9/2004 | Bunnell et al. |
| 8,424,914 | B2 | 4/2013 | Honzek |
| 8,490,821 | B2 | 7/2013 | Tam et al. |
| 9,556,772 | B2 | 1/2017 | Mitobe et al. |
| 10,094,260 | B2 | 10/2018 | Karsch et al. |
| 2002/0170616 | A1 | 11/2002 | Channing |
| 2005/0022515 | A1 | 2/2005 | Stiermann |
| 2007/0209631 | A1 | 9/2007 | Campenon et al. |
| 2009/0090726 | A1 | 4/2009 | Kawamata |
| 2017/0016374 | A1 | 1/2017 | Shimoyamada |
| 2017/0305264 | A1 | 10/2017 | Haeberer |
| 2018/0251021 | A1 | 9/2018 | Caporale et al. |

FOREIGN PATENT DOCUMENTS

| | | | | | |
|---|---|---|---|---|---|
| DE | 748096 | C | 10/1944 | | |
| DE | 4334703 | A1 | 4/1995 | | |
| DE | 19605702 | A1 | 8/1997 | | |
| DE | 19605703 | A1 * | 8/1997 | .......... | B60K 15/077 |
| DE | 19644464 | A1 | 4/1998 | | |
| DE | 19729003 | A1 | 2/1999 | | |
| DE | 10323072 | A1 | 12/2004 | | |
| DE | 102010021301 | A1 | 3/2011 | | |
| DE | 102013105884 | A1 | 12/2014 | | |
| DE | 102013011342 | A1 | 1/2015 | | |
| EP | 1974975 | A1 | 10/2008 | | |
| EP | 2017113 | A1 | 1/2009 | | |
| EP | 2058161 | A1 | 5/2009 | | |
| EP | 1736350 | B1 | 1/2011 | | |
| EP | 2308710 | A1 | 4/2011 | | |
| FR | 2671542 | A1 | 7/1992 | | |

OTHER PUBLICATIONS

UK Intellectual Property Office, Search report for related UK Application No. GB2020251.1, dated May 19, 2021, 5 pages.

* cited by examiner

CONTAINER SYSTEM

CROSS-REFERENCE TO RELATED APPLICATIONS

This application is a national phase entry under 35 U.S.C. § 371 of International Patent Application PCT/IB2021/059663, filed Oct. 20, 2021, designating the United States of America and published in English as International Patent Publication WO 2022/136954 A1 on Jun. 30, 2022, which claims the benefit of the filing date of U. K. Patent Application GB 2020521.1, filed Dec. 21, 2020, the entire disclosure each of which is incorporated herein by reference.

TECHNICAL FIELD

The present disclosure relates to a container system. More particularly, the present disclosure relates to a container system in which two separate container bodies are configured to be connected together to form a container sub-assembly for mounting to a support structure of a vehicle or agricultural machine.

BACKGROUND

Current emission regulations require vehicles with combustion engines to regulate their exhaust gas emissions. To fulfil these regulations, it is common to install selective catalytic reduction systems ("SCR systems"), which reduce exhaust pollutants such as carbon monoxide, nitrogen oxides, and particulate matter in exhaust gases. In known SCR systems, a reductant, such as urea solution, is injected into the exhaust gas. For this purpose, it is necessary to provide a container for storing such a reductant. SCR systems are well known on agricultural machines such as tractors, combines, and forage harvesters, but are also used on other vehicles.

For use with a SCR system, it is common to provide two containers on a vehicle or agricultural machine, a first container for fuel and a secondary container for a urea solution or other reductant. To use the existing free space to its full extent, the two containers are often located next to each other and have complementary outer contours, so that the containers can be accommodated with a minimal space requirement, even when the containers comprise complex designs. To achieve good mechanical stability, the two containers have to be connected to each other and to a supporting structure with connection elements, such as straps, screws, or so on. This results in increased assembly times with more steps in sometimes hard-to-reach work environments.

German patent application DE 10 2013 011 342 A1 discloses a way to attach a tank to a vehicle by designing the tank with a sleeve, which extends through the tank. A screw is located in this sleeve to attach the tank to a supporting structure of the vehicle. The sleeve also acts as the contact area for the tank with the screw and the supporting structure. This provides a useful way to mount a single container to a vehicle. However, if two containers have to be connected to the vehicle, then the arrangement of the two containers to each other could be complicated using the arrangement disclosed. It would be difficult and time consuming to adjust the two sleeves of the containers to each other. This is a disadvantage, since it prolongs the assembly process.

German patent application DE 10 2013 105 884 A1 discloses an agricultural vehicle with two tanks, a fuel tank and a secondary tank for a urea solution, whereby these two tanks are constructed as one integral component with two chambers. The method of manufacturing the combined tanks is complex and damage to one of the tank chambers would require replacement of the whole tank assembly.

European patent application EP 2 058 161 A1 discloses a fuel tank for a utility vehicle, whereby the fuel tank comprises a recess to attach a secondary tank for a urea solution to the fuel tank. The secondary tank is fixedly connected to the surrounding walls of the fuel tank by screwing, welding, or gluing. This arrangement has the disadvantage that the volume of the secondary tank is limited by the recess of the first tank. Furthermore, attachment of the secondary tank to the main fuel tank requires many steps and so is time consuming.

It would be beneficial to provide a container system which overcomes, or at least mitigates, one or more drawbacks of the known container systems.

It would be beneficial to provide a container system for storing two fluids separately that is easily assembled.

It would be beneficial to provide an arrangement for connecting together two separate container bodies which overcomes, or at least mitigates, at least one drawback of known connecting arrangements.

It would be beneficial to provide an alternative arrangement for mounting a pair of containers to a supporting structure which overcomes, or at least mitigates, a drawback of the known mounting arrangements.

BRIEF SUMMARY

A container system, a container sub-assembly, and a vehicle or agricultural machine comprising such a container system and/or container sub-assembly are disclosed, as well as methods of mounting such container system and/or container sub-assembly to a support structure, which may be part of a vehicle or agricultural machine.

In some embodiments, a container system comprises two separate container bodies, each defining a respective interior volume suitable for holding a fluid, the container bodies being connectable to each other to form a container sub-assembly, wherein each of the container bodies defines a respective connector passageway open to the exterior of the container and fluidly isolated from the interior volume. The connector passageways defined by the two container bodies are aligned co-axially when the container bodies are positioned for assembly to form the container sub-assembly.

The aligned connector passageways can be used to connect the two container bodies together.

Each respective connector passageway is an external passageway having opposed ends and may be connected to the exterior of the container at either end. Each connector passageway may extend between opposed side wall regions of the container body.

In an embodiment, a first connector passageway defined by a first of the container bodies has an inlet end and an outlet end. A second connector passageway defined by a second of the container bodies also has an inlet end and an outlet end. When the container bodies are positioned for assembly to form the container sub-assembly, the outlet end of the first connector passageway is proximal the inlet end of the second connector passageway, with the inlet end of the first connector passageway being distal from the second container body and the outlet end of the second connector passageway being distal from the first container body.

In an embodiment, the container system further comprises a connector for holding the two container bodies together to form the container sub-assembly The connector has a shaft for insertion through the first connector passageway into the second connector passageway and a head at one end of the shaft. The shaft and the second container body have complementary rotary fastening formations, the arrangement being such that, in use, the connector shaft is insertable through the first connector passageway from the inlet end and into the second connector passageway. The complementary rotary fastening formations engage and the connector is turned to tighten the connecter until the head portion engages the first container body to clamp the container bodies together.

Advantageously, the connector is used to connect the two container bodies together to form a structurally stable sub-assembly which is easy to handle, transport, and store, which can be subsequently assembled to a supporting structure, and which may be part of a vehicle or agricultural machine.

The complementary rotary fastening formations can be, for example, complementary male and female thread formations or complementary bayonet formations.

The connector may have a through passage or bore.

In an embodiment, the connector is in the form of a hollow screw.

In an embodiment in which the connector has a through passage, the system may include a fastener for securing the container sub-assembly to a supporting structure. The fastener has a shaft for insertion through the passage of the connector and a head portion at one end of the shaft for engagement with the head of the connector, the arrangement being configured such that, in use, when the shaft of the fastener is inserted through the connector, a free end of the fastener shaft distal from the head projects beyond the connector when its head is in abutment with the head of the connector. The distal free end of the fastener shaft is configured for engagement with a mounting formation on the supporting structure. The distal free end of the fastener shaft and the mounting formation may have corresponding thread formations, the arrangement configured such that the fastener can be screwed into the mounting formation to clamp the connector to the supporting structure.

The connector passageways may be tubular. A second connector passageway defined by a second one of the container bodies being tapered, becoming narrower in a direction from its inlet end to its outlet end, at least in a region between its inlet end and the thread formation. The second connector passageway may be conical.

The first and second container bodies may have complementary contours.

In an embodiment, the first and second container bodies have corresponding walls which oppose one another when the container bodies are assembled together to form the container sub-assembly, the opposing walls being contoured to define at least one contact region where the opposing walls abut one another when the container bodies are clamped together by the connector. At least one contact region may be provided adjacent a periphery of the first and second passageways. This may comprise an annular boss defined by one of the opposing walls encircling its respective passageway. The opposing walls may be contoured to define a plurality of contact regions and a plurality of non-contact regions in which the opposed walls are spaced apart when the container bodies are assembled together to form the container sub-assembly.

One of the first and second container bodies may define a protrusion and the other of the first and second container bodies a complementary recess, the protrusion being received in the complementary recess when the container bodies are assembled together to form the container sub-assembly. The protrusion and the recess may be configured to resist relative rotary movement between the first and second container bodies about an axis of the connector.

In an embodiment, a first one of the container bodies comprises a first inlet for introducing fluid into the interior volume of the first container body and a second inlet for introducing fluid into the interior volume of the second container body, wherein the second inlet is fluidly connected to the interior volume of the second container body by a duct extending through the interior volume of the first container body.

In some embodiments, a container sub-assembly comprises two separate container bodies, each defining a respective interior volume suitable for holding a fluid and a connector passageway. The connector passageways are aligned co-axially. A first connector passageway defined by a first of the container bodies has an inlet end and an outlet end. A second connector passageway defined by a second of the container bodies has an inlet end and an outlet end, and the outlet end of the first connector passageway is proximal the inlet end of the second connector passageway. The sub-assembly further comprises a connector holding the two container bodies together, the connector having a shaft and a head at one end of the shaft. The free end of the shaft distal from the head is inserted through the first connector passageway and into the second connector passageway. The shaft and the second container body have complementary rotary fastening formations which are engaged, the head of the connector engaging the first container body such that the connector clamps the container bodies together.

A vehicle or agricultural machine comprises a container system or a container sub-assembly.

In an embodiment, the vehicle or agricultural machine has a supporting structure including a mounting formation. The container sub-assembly is secured to the supporting structure by a fastener inserted through the connector and engaged with the mounting formation. The fastener may be operative to clamp the connector to the supporting structure. The fastener may be a screw or bolt having a threaded shaft for engagement with a complementary thread on the mounting formation and a head for engagement with the head of the connector.

A method of assembling a container system to a supporting structure comprises using the connecter to secure the first and second container bodies together to form a container sub-assembly, subsequently mounting the container sub-assembly to the supporting structure by inserting the shaft of the fastener through the connector and engaging the distal free end of the fastener shaft with a mounting formation on the supporting structure, and tightening the fastener until the fastener head engages the head of the connector to clamp the connector to the supporting structure.

The supporting structure may be part of a vehicle or agricultural machine.

BRIEF DESCRIPTION OF THE DRAWINGS

Embodiments will now be described, by way of example only, with reference to the accompanying drawings, in which.

DETAILED DESCRIPTION

Figure 1:
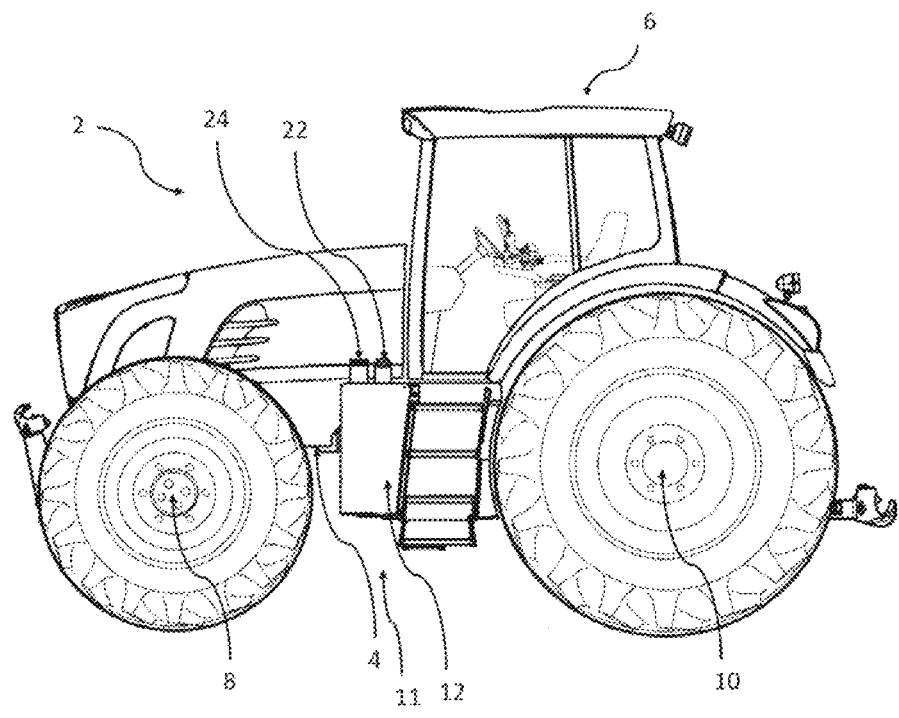
FIG. 1 is a side view of an agricultural machine in the form of a tractor incorporating a container system.

FIG. 1 illustrates an agricultural machine 2, especially in the form of a tractor. The tractor 2 comprises a chassis 4, a cab 6, a front axle 8, a rear axle 10, and a container system 11 including a first container body 12 for fuel and a second container body (14, see FIG. 2) for a fuel additive, such as urea solution. The first and second container bodies 12, 14 can also be referred to as tanks, e.g. a main fuel tank and a secondary fuel additive tank.

The term "agricultural machine" is intended to cover self-propelled agricultural vehicles, such as tractors, combines, and forage harvesters and the like. The term also covers agricultural machines which are not self-propelled but which may have an internal combustion engine and so require a dual tank system for fuel and a fuel additive. However, it will be appreciated that the disclosure can be adapted for use with other types of vehicle. Indeed, it should be noted that the disclosure is not limited to the provision of a dual tank system for a fuel and fuel additive and that a container system 11 in accordance with the invention can be adopted wherever it is desirable to provide two containers that define separate interior volumes to hold separate volumes of fluid or other flowable materials adjacent one another.

The first and second container bodies 12, 14 are separate bodies which each define an internal volume for holding a fluid, in this case a fuel and a fuel additive, respectively. The first and second container bodies 12, 14 are connected together to form a container sub-assembly 16 and mounted to a supporting structure 18 of the tractor using a connector arrangement 20.

Figure 2:
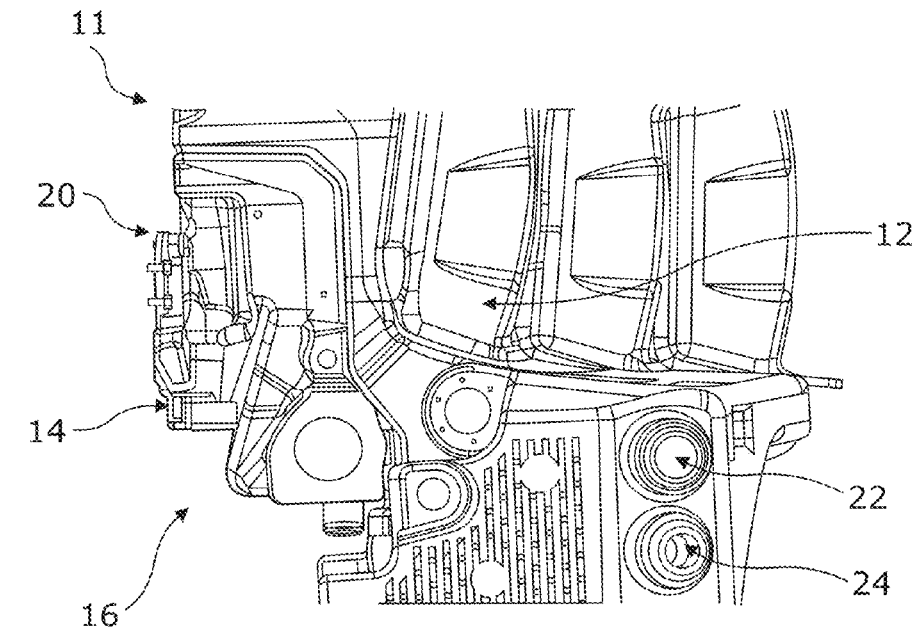
FIG. 2 is a view from above of a container sub-assembly comprising two container bodies connected together and which forms part of the container system of FIG. 1.

FIG. 2 is a view from above of the container sub-assembly 16 with the two container bodies 12, 14 connected together. The second container body 14 is smaller than the first container body 12, and the container bodies have complementary external contours so that two container bodies are positioned close together with minimal space between them. This reduces the overall volume occupied by the two container bodies 12, 14 and forms a stable connection between the container bodies that is easy to assemble.

In the present embodiment, the second container body 14 is located between the first container body 12 and the supporting structure 18 (shown in FIG. 5) of the tractor to which the container sub-assembly 16 is attached. The first container body 12 has a first inlet 22 though which fluid can be introduced into the interior volume of the first container body 12. The first container body 12 also has a second inlet 24 fluidly connected with the interior volume of the second container body 14 by a duct (not shown) which passes through the interior volume of the first container body 12 but is not fluidly connected to the interior volume of the first container body. This allows the two inlets 22, 24 to be positioned close to one another at a position where they can be easily accessed for re-fueling while keeping the fuel and the additive separate.

Figure 3:
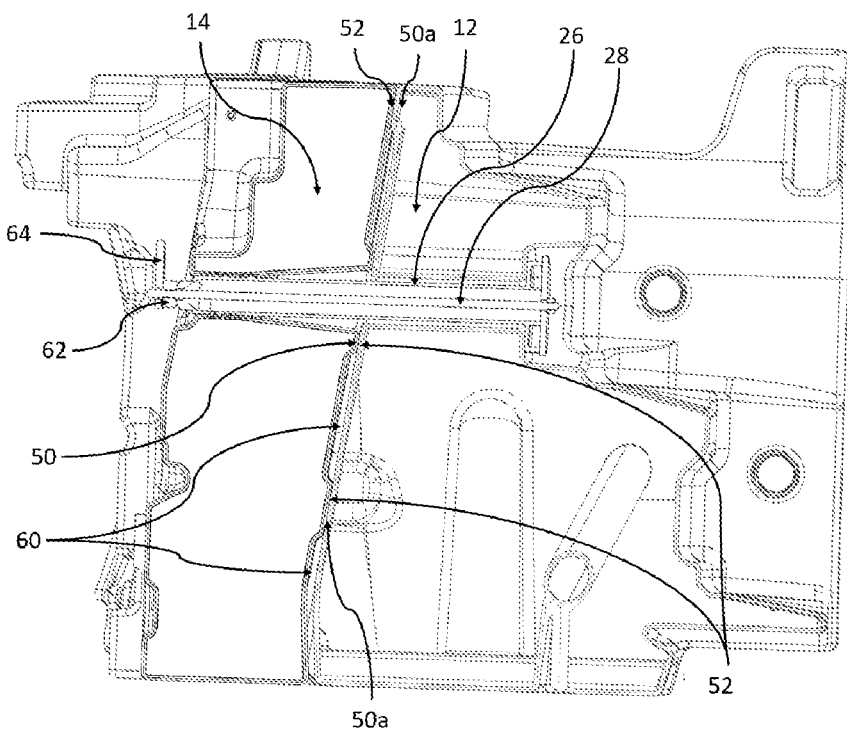
FIG. 3 is a sectional view taken from one side through the container sub-assembly and part of a supporting structure of the tractor of FIG. 1, illustrating a connector arrangement for holding the two container bodies together to form the container sub-assembly and for securing the container sub-assembly to a supporting structure of the tractor.
Figure 4:
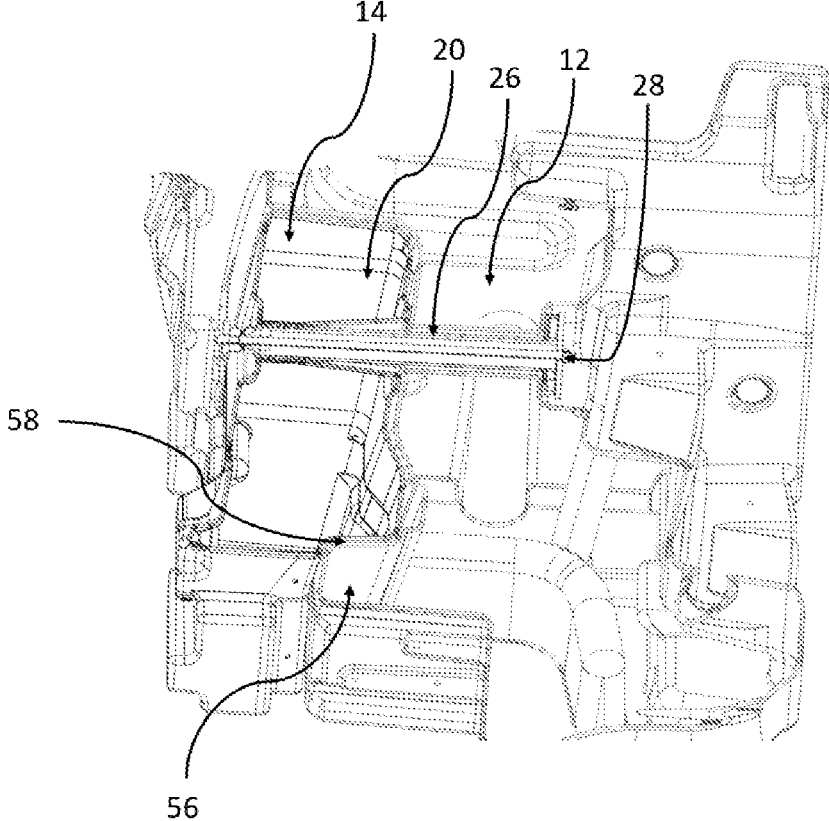
FIG. 4 is a view similar to that of FIG. 3, but where the sectional view is taken diagonally from the top and one side.
Figure 5:
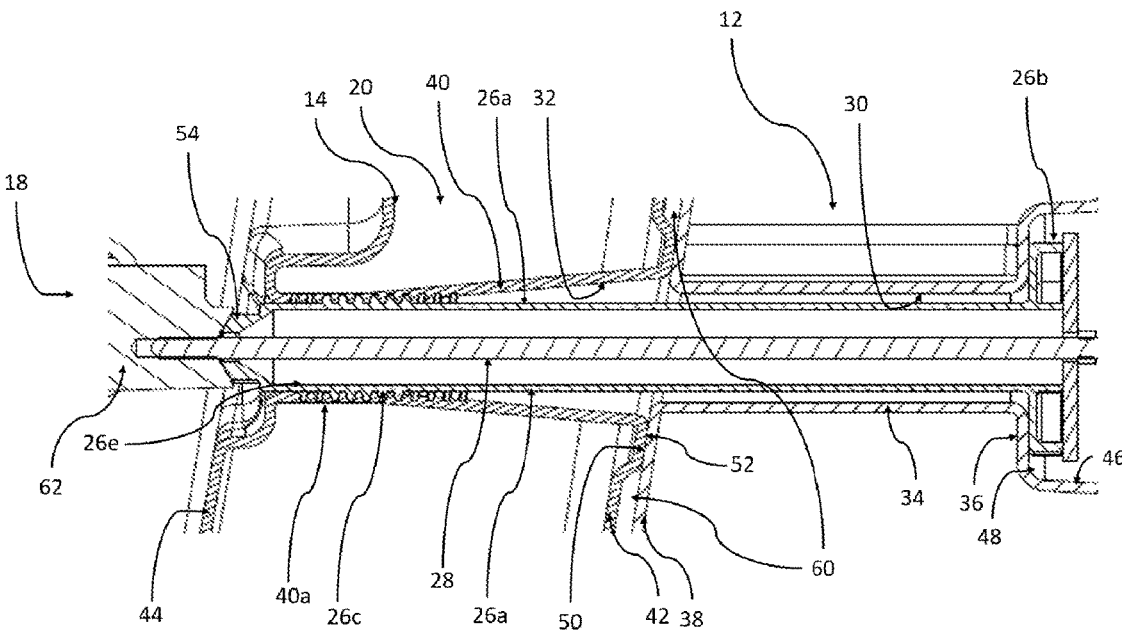
FIG. 5 is a sectional view from above through part of the container sub-assembly and supporting structure of FIGS. 3 and 4, showing details of the connector arrangement.

FIGS. 3 through 5 illustrate in more detail how the first and second container bodies 12, 14 are connected together to form the container sub-assembly 16 and how the sub-assembly is secured to the supporting structure 18 of the tractor using the connector arrangement 20. The supporting structure 18 may be any convenient part of the tractor to which the container sub-assembly 16 can be securely attached. It may be part of the chassis 4 or a frame attached to the chassis 4.

The connector arrangement 20 includes two parts: a connector 26 which holds the container bodies together to from the container sub-assembly 16 and a fastener 28 which secures the connector 26, and hence the container sub-assembly, to the supporting structure 18.

The connector 26 is in the form of a hollow screw having a shaft 26a, a head or outwardly directed radial flange 26b at one end of the shaft, and a male thread formation 26c on the exterior surface of the shaft 26a in a region close to the other end of the shaft distal from the head 26b. The shaft 26a of the connector 26 is inserted through aligned external connector passageways 30, 32 defined by the first and second container bodies 12, 14 respectively. The hollow connector 26 defines a central bore or through-passage 26e, which extends longitudinally through the connector to enable the fastener 28 to be inserted through the connector as described in detail below. For the avoidance of doubt, it should be understood that the term "through bore" as used in this context is intended to cover any cavity, passage or hole extending fully through a body regardless of how it is produced and should, for example, be interpreted as covering a through-passage produced when a component is molded.

The connector passageways 30, 32 are in the form of tubular tunnels extending through a region of their respective container bodies between spaced walls. The connector passageways 30, 32 are fluidly isolated from the interior volume of their respective container body 12, 14, but are open to the exterior at either end. A first connector passageway 30 of the first container body 12 is defined by a substantially cylindrical tubular portion 34 of the first body which extends between a first wall 36 of the first container body 12 at an inlet end to a second wall 38 of the first container body 12 at an outlet end. A second connector passageway 32 defined by the second container body 14 is defined by a conical tube portion 40 of the second container body extending between a first wall 42 of the second container body 14 at an inlet end and a second wall 44 of the second container body 14 at an outlet end. The conical tube portion 40 tapers from its inlet end to its outlet end.

The connector passageways 30, 32 are elongate, each having a longitudinal axis. When the first and second container bodies are positioned to be assembled together to form the container sub-assembly, the first and second connector passageways 30, 32 are aligned co-axially so that the shaft 26a of the connector can be inserted through the first connector passageway 30 and into the second connector passageway 32. The first wall 36 of the first container body 12 defines a recess 46 having a planar wall region or base 48 surrounding the entrance to the first connector passageway 30 and which extends perpendicular to the axis of the connector passageway 30. The first wall 42 of the second container 14, defines an annular boss 50 surrounding the entrance to the second connector passageway 32 and which projects towards the opposing second wall 38 of the first container body 12 to form a first contact region 52.

The male thread formation 26c of the connector shaft 26a is arranged to engage with a corresponding female thread formation 40a provided on the inner surface of the conical tube 40 towards the outlet end of the second connector passageway 32. The tapered, conical shape of the second connector passageway 32 makes it easier for the shaft 26b to be inserted into the second connector passageway 32 and the external male thread formation 26c engaged with the female thread formation 40a.

To connect the two container bodies 12, 14 together to form the container sub-assembly 16, they are positioned adjacent one another in the correct alignment to be assembled together to form the sub-assembly 16, with the first and second connector passageways 30, 32 aligned coaxially. The shaft 26a of the connector 26 is inserted through the inlet end of the first connector passageway 30, passing through the first connector passageway and into the second connector passageway 32 through its inlet end. Once the shaft has been inserted far enough, the corresponding thread formations 26c, 40a are engaged. At this stage, the head 26b of the connector is located in the recess 46 and the connector is screwed into the female thread formation 40a until the head engages the base 48 of the recess. The connector 26 is then tightened further so as to clamp the two container bodies 12, 14 together, with the annular boss 50 of the first wall 42 of the second container body 14 abutting the second wall 38 of the first container body 12. Once the connector 26 is fully tightened, the two container bodies 12, 14 are firmly attached to one another by the connector 26 to constitute the container sub-assembly 16.

Figure 6:
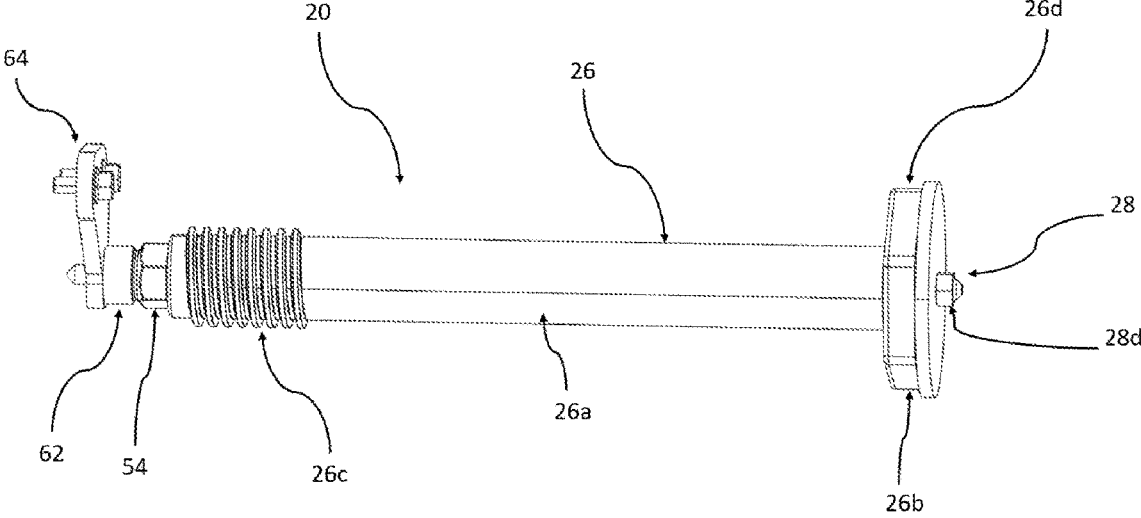
FIG. 6 is a perspective view of the connector arrangement of FIG. 5, with the containers omitted.
Figure 7:
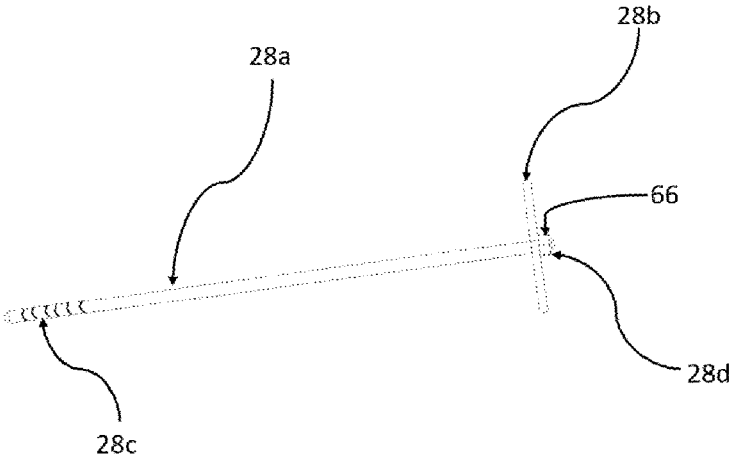
FIG. 7 is a side view of a fastener forming part of the connector arrangement of FIG. 6.
Figure 8:
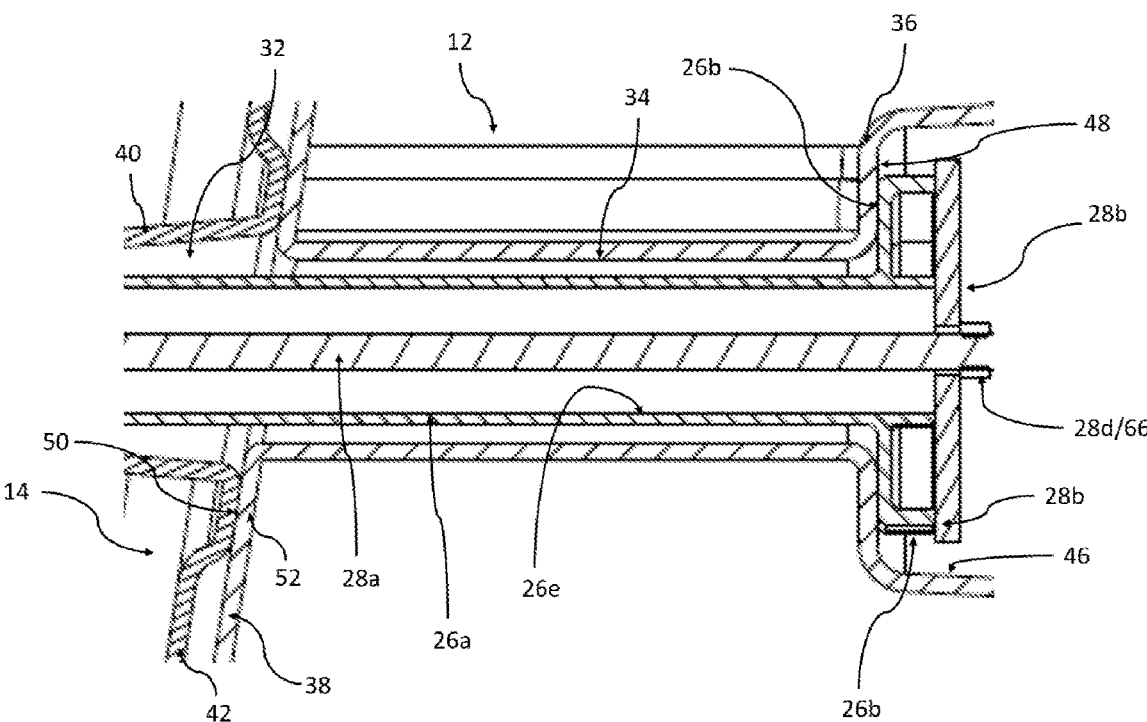
FIG. 8 is a view of an enlarged scale of part of the connector arrangement of FIG. 5.

The head 26b of the connector is provided with a drive formation 26d engageable by a tool to tighten the connector 26 and clamp the container bodies 12, 14 together. As illustrated in FIG. 6, the exterior periphery of the head may be provided with two or more flat sections and may be hexagonal so as to be engageable by a suitable tool, such as a spanner, wrench, or socket. It will be appreciated that other drive formations could be used. For example, the head 26b may be provided with a polygonal socket for engagement by a wrench, such as a hexagonal wrench. As illustrated in FIGS. 5 and 6, the distal end of the connector shaft 26a may project beyond the second container body 14 when fully inserted, and the distal end of the connector shaft 26a may also be provided with a drive formation 54 engageable by a suitable tool to rotate the connector 26. The drive formation 54 may, for example, be in the form of a hexagonal exterior profile to be engageable by a suitable spanner, wrench, or socket so that the connector 26 can be rotated using a tool from either end. This may be advantageous where access to the connector at the head end is difficult.

To further support the container bodies 12, 14 in their assembled condition, the exterior of the container bodies 12, 14 may be contoured to provided one or more corresponding features that engage or otherwise cooperate when the container bodies 12, 14 are assembled together to provide additional stability. For example and as illustrated in FIG. 4, one of the container bodies, in this case the first container body 12, may be profiled to define a protrusion 56 which engages with a close fit in a correspondingly shaped recess 58 defined by the other container body, in this case the second container body 14. The protrusion 56 and recess 58 may be shaped and configured to resist relative rotation of the container bodies about the axis of the connector 26. For example, the protrusion 56 and recess 58 may have complementary polygonal shapes in lateral cross-section which may be triangular or square, for example. It will be appreciated that the protrusion could be provided by the second container body 14 and the recess by the first 12. It will also be appreciated that more than one set of corresponding features could be provided.

In addition to the boss 50 surrounding the entrance to the second passageway, the first wall 42 of the second container and/or the second wall of the first container body 12 may be contoured to provide a number of other bosses or projections 50a which abut the opposing wall of the other container body 14 when the container bodies 12, 14 are clamped together. The bosses 50, 50a define contact regions 52 where the opposed walls of the containers abut one another to provide stability. Between the contact regions 52, the opposed walls define non-contact regions 60 where they are spaced apart, even when the two container bodies 12, 14 are clamped together. Where the opposed walls are spaced apart in the non-contact regions 60, the gaps function as compensation areas to allow for pressure deformations of the container walls, and also as heat-isolation layers between the two container bodies 12, 14.

Though corresponding screw threads 26c, 40a on the connector shaft 26a and the wall 40 of the second connector passageway provide a convenient way of engaging the connector shaft 26a with the second container body 14 to clamp the container bodies 12, 14 together, alternative types of complementary rotary fastening formations which can be engaged to enable the connector 26 to twisted to clamp the container bodies 12, 14 together can be used. For example, the male thread formation could be provided on the tube 40 and the female thread formation on the connector shaft 26a. In a further alternative, the connector shaft 26a and the tube 40 could be interlocked using bayonet or other twist-lock arrangements. It should also be noted that though it is convenient to form the second connector passageway 32 using a conical tube 40, the tube 40 need not be conical provided that it is tapered or otherwise shaped to enable the threaded end of the connector shaft 26a to pass into the second connector passageway 32 and engage with the corresponding thread 40a on the inner surface of the tube 40.

The sub-assembly 26 comprising the first and second container bodies 12, 14 clamped together by the connector 26 forms a stable structure which is easily handled, stored, and transported. The container bodies 12, 14 and connector 26 may be manufactured and assembled together to form the container sub-assembly 16 by a supplier and transported to a different facility for assembly to an agricultural machine 2 or other vehicle.

The fastener 28 is used to secure the container sub-assembly 16 to the supporting structure 18. The fastener is in the form of an elongate screw or bolt having a shaft 28a, a head portion or outwardly directed radial flange 28b at one end of the shaft, and a male thread formation 28c defined in an outer surface of the shaft 28a towards its free end, distal from the head 28b. To assemble the container sub-assembly 16 to the supporting structure 18, the sub-assembly 16 is positioned in its desired location adjacent the supporting structure 18 in which the central through-bore or passage 26e of the connector is aligned co-axially with a mounting formation 62 having an aperture or hole with a corresponding female thread formation. The free end of the fastener shaft 28a is inserted through the central through passage 26e of the connector 26 until the free and of the shaft 28a locates in the mounting formation and the corresponding thread formations engaged. In this position, the head 28b of the fastener 28 is within the recess 46 close to and overlying the head 26b of the connector 26. The fastener 28 is screwed into the mounting formation 62 until its head 28*b* engages the head 26*b* of the connector 26. The fastener is further tightened until the connector 26 is firmly clamped between the head of the fastener 28*b* and the mounting formation 62. This secures the container sub-assembly 16 to the supporting structure 18. The opposed surfaces at the free end of the connector shaft 26*a* and the mounting formation 62 may have corresponding part spherical profiles to ensure the connector 26 aligns correctly with the mounting formation 62 when the fastener 28 is tightened. In this embodiment, the mounting formation 62 is provided on a mounting bracket 64 which is attached to a structural frame of the tractor to form a part of the supporting structure 18. The mounting formation 62 may be in the form of a captive nut or the like securely affixed to the mounting bracket 64.

It will be noted that when the fastener 28 is tightened, the clamp load is borne by the connector 26 rather than the container bodies 12, 14. This helps to reduce the risk of the container bodies 12, 14 being damaged, such as by over tightening of the fastener 28, and makes assembly of the container sub-assembly 16 to the supporting structure 18 simpler and easier as the fitter does not have to be concerned with the risk of damaging the container bodies 12, 14.

The connector 26 can be made of any suitable material provided that it is sufficiently rigid in both compression and tension in its longitudinal/axial direction so that is able to clamp the two container bodies 12, 14 together and itself be clamped to the supporting structure 18 without significantly deforming. In an embodiment, the connector 26 is molded from polymeric materials.

The head 28*b* of the fastener 28 may be provided with a drive formation 28*d* engageable by a suitable tool so that the tool can be used to rotate and tighten the fastener 28. As illustrated, the shaft 28*a* and the head 28*b* may be separate components and the head secured to an end of the shaft 28*a* by means of a nut 66 which engages with an external thread on the end of the shaft to clamp the head to a shoulder on the shaft. In this case, the nut 66 can also be used as a drive formation to screw the fastener into the mounting formation 62. However, it will be appreciated that this need not be the case, that the head and shaft of the fastener could be formed as an integral component, and that other suitable drive formations can be adopted.

The fastener 28 may be made of any suitable materials. In an embodiment the fastener 28 is made of metallic materials such as steel or aluminum.

It is to be understood that the disclosure is not limited to the use of one connector arrangement for holding the container bodies 12, 14 together. Multiple connectors 26 can be used to connect the container bodies 12, 14 to each other with corresponding connector passageways 30, 32 in the first and second container bodies 12, 14. In this case, some, or all, of the connectors 26 may be combined with a fastener 28 to secure the container sub-assembly 16 to the supporting structure 18 at multiple locations. In some embodiments, the fastener 28 could take other forms and engagement of the fastener 28 with the mounting formation 62 may use an alternative rotary connection to a male and female thread such as a bayonet or alternative twist-fit connection. This disclosure is therefore intended to cover any variations, uses or adaptations of the invention using its general principles. Further, this disclosure is intended to cover such variations within known or customary practice in the art and which fall within the limits of the appended claims.

The invention claimed is:

1. A container system comprising:
first and second container bodies, each container body defining a respective interior volume suitable for holding a fluid, the container bodies being connectable to each other to form a container sub-assembly, wherein:
each of the container bodies defines a respective connector passageway open to the exterior of the respective container body and fluidly isolated from the interior volume, the respective connector passageways defined by the two container bodies being aligned co-axially when the container bodies are positioned for assembly to form the container sub-assembly;
a first connector passageway defined by the first container body has an inlet end and an outlet end;
a second connector passageway defined by the second container body has an inlet end and an outlet end; and
the outlet end of the first connector passageway is proximal to the inlet end of the second connector passageway when the first and second container bodies are positioned for assembly to form the container sub-assembly; and
a connector having a shaft configured to be inserted through the first connector passageway into the second connector passageway and a head at one end of the shaft, wherein the shaft and the second container body have complementary rotary fastening formations, and wherein the connector shaft is configured to be inserted through the first connector passageway from the inlet end and into the second connector passageway such that the complementary rotary fastening formations engage when the connector is turned to tighten the connector and engage the head with the first container body to hold the first and second container bodies together.

2. The container system of claim 1, wherein the complementary rotary fastening formations are selected from the group consisting of complementary male and female thread formations, and complementary bayonet formations.

3. The container system of claim 1, wherein the connector defines a through passage.

4. The container system of claim 3, further comprising a fastener configured to secure the container sub-assembly to a supporting structure, the fastener having a shaft for insertion through the passage of the connector and a head portion at one end of the shaft for engagement with the head of the connector, wherein the fastener is configured such that a free end of the fastener shaft distal from the head projects beyond the connector when the head portion of the fastener abuts the head portion of the connector, and the distal free end of the fastener shaft is configured to engage with a mounting formation on the supporting structure.

5. The container system of claim 4, wherein the distal free end of the fastener shaft has a thread configured to engage with a corresponding thread on the mounting formation.

6. A method of assembling the container system of claim 4 to a supporting structure, the method comprising:
using the connector to secure the first and second container bodies together to form a container sub-assembly;
mounting the container sub-assembly to the supporting structure by inserting the shaft of the fastener through the connector and engaging the distal free end of the fastener shaft with a mounting formation on the supporting structure; and tightening the fastener until the fastener head engages the head of the connector to clamp the connector to the supporting structure.

7. The method of claim 6, wherein the supporting structure is part of an agricultural machine.

8. The container system of claim 1, wherein the first connector passageway is tubular.

9. The container system of claim 8, wherein the second connector passageway is tapered, becoming narrower in a direction from its inlet end to its outlet end.

10. The container system of claim 9, wherein the second connector passageway is conical.

11. The container system of claim 1, wherein the first and second container bodies have complementary contours.

12. The container system of claim 1, wherein the first and second container bodies have corresponding walls which oppose one another when the container bodies are assembled together to form the container sub-assembly, the opposing walls being contoured to define at least one contact region where the opposing walls abut one another when the first and second container bodies are clamped together by the connector.

13. The container system of claim 12, wherein the at least one contact region is adjacent a periphery of the first and second connector passageways.

14. The container system of claim 12, wherein the opposing walls are contoured to define:

a plurality of contact regions; and a plurality of non-contact regions in which the opposed walls are spaced apart when the container bodies are assembled together to form the container sub-assembly.

15. The container system of claim 1, wherein one of the first and second container bodies defines a protrusion and the other of the first and second container bodies defines a complementary recess, the protrusion being received in the complementary recess when the first and second container bodies are assembled together to form the container sub-assembly.

16. An agricultural machine comprising the container system of claim 1.

17. The agricultural machine of claim 16, further comprising:

a supporting structure including a mounting formation;

a fastener for securing the container sub-assembly to the supporting structure, the fastener having a shaft for insertion through the passage of the connector and a head portion at one end of the shaft for engagement with the head of the connector, the arrangement being configured such that a free end of the fastener shaft distal from the head portion projects beyond the connector when the head portion abuts the head of the connector, the distal free end of the fastener being engaged with the mounting formation to secure the container sub-assembly to the supporting structure.

18. The agricultural machine of claim 17, wherein the fastener is operative to clamp the connector to the supporting structure.

* * * * *